United States Patent
Aberg et al.

(10) Patent No.: US 9,898,119 B2
(45) Date of Patent: Feb. 20, 2018

(54) TOUCH SCREEN INTERFACE WITH FEEDBACK

(71) Applicant: Sony Mobile Communications AB, Lund (SE)

(72) Inventors: Peter Aberg, Vinslov (SE); Magnus Johansson, Malmo (SE); Gunnar Klinghult, Lund (SE); Magnus Midholt, Lund (SE)

(73) Assignee: Sony Mobile Communications Inc., Lund (SE)

( * ) Notice: Subject to any disclaimer, the term of this patent is extended or adjusted under 35 U.S.C. 154(b) by 102 days.

(21) Appl. No.: 14/111,653

(22) PCT Filed: Jan. 21, 2013

(86) PCT No.: PCT/EP2013/051006
§ 371 (c)(1),
(2) Date: Oct. 14, 2013

(87) PCT Pub. No.: WO2013/124099
PCT Pub. Date: Aug. 29, 2013

(65) Prior Publication Data
US 2014/0218317 A1    Aug. 7, 2014

Related U.S. Application Data

(60) Provisional application No. 61/600,766, filed on Feb. 20, 2012.

(51) Int. Cl.
*G06F 3/041* (2006.01)
*G06F 3/0488* (2013.01)
*G06F 3/01* (2006.01)

(52) U.S. Cl.
CPC ............ *G06F 3/0414* (2013.01); *G06F 3/016* (2013.01); *G06F 3/0488* (2013.01); *G06F 2203/04101* (2013.01); *G06F 2203/04105* (2013.01)

(58) Field of Classification Search
CPC ........ G06F 3/041; G06F 3/0414; G06F 3/016; G06F 3/0488; G06F 2203/04105; G06F 2203/04101
(Continued)

(56) References Cited

U.S. PATENT DOCUMENTS 6,118,435 A * 9/2000 Fujita ................ G06F 3/016
 345/173
6,219,034 B1   4/2001 Elbing et al.
(Continued)

FOREIGN PATENT DOCUMENTS

EP    0556999 A1    8/1993
EP    2369444 A1    9/2011
(Continued)

OTHER PUBLICATIONS

International Search Report and Written Opinion from corresponding International Application No. PCT/EP2013/051006, dated Apr. 18, 2013.
(Continued)

*Primary Examiner* — Abbas Abdulselam
(74) *Attorney, Agent, or Firm* — Renner, Otto, Boisselle & Sklar, LLP

(57) ABSTRACT

The invention relates to a method and an electric device comprising a screen (110), cooperating with said screen a sensor for detecting a presence of an object on or close to said screen, a controller (120) and a feedback element (140). The controller (120) is configured to interpret said presence of the object and calculate a force value and control said feedback element (140) to provide a feedback with respect to the force value.

18 Claims, 4 Drawing Sheets

(58) Field of Classification Search
USPC .......................................................... 345/173
See application file for complete search history.

(56) References Cited

U.S. PATENT DOCUMENTS

| | | | |
|---|---|---|---|
| 9,489,046 B2* | 11/2016 | Cruz-Hernandez | G06F 3/016 |
| 2004/0056845 A1* | 3/2004 | Harkcom | G06F 3/044 |
| | | | 345/173 |
| 2008/0289887 A1* | 11/2008 | Flint | G06F 3/0414 |
| | | | 178/18.03 |
| 2009/0058829 A1* | 3/2009 | Kim et al. | 345/173 |
| 2012/0056834 A1* | 3/2012 | Kim | G06F 3/0418 |
| | | | 345/173 |
| 2013/0033450 A1* | 2/2013 | Coulson et al. | 345/174 |

FOREIGN PATENT DOCUMENTS

| | | | |
|---|---|---|---|
| WO | 2008042745 | A2 | 4/2008 |
| WO | 2009028921 | A2 | 3/2009 |

OTHER PUBLICATIONS

Written Opinion from corresponding International Application No. PCT/EP2013/051006, dated Mar. 7, 2014.

\* cited by examiner

TOUCH SCREEN INTERFACE WITH FEEDBACK

TECHNICAL FIELD

Implementations described herein relate generally to user input processing, and more particularly, to devices that may provide a feedback to the user upon detection of an object in vicinity and execute operations based on the detection.

BACKGROUND

Many multimedia devices employ touch screen technology. For example, a user may be able to interact with an image on a display screen by placing finger(s) or a pointing device (stylus) on a screen and enter a command by moving or tapping the finger/pointing device, to achieve the desired effect. The use of touch screen technology allows a user to easily navigate through menus and manipulate displayed data. Touch screen technology is also employed in various gaming applications.

The new touch screens also allow detection of the pointing device in vicinity of the screen plane without an actual physical touch. This allows a three-dimensional interaction with the device.

When touching the screen, the user may receive a feedback in way of a sound and/or visual signal or a physical (haptic) feedback.

Haptic technology is becoming more prevalent at least partially due to the evolution of touch screen devices. Haptic feedback is the use of forces, such as vibrations, to provide a user with the sensation of "feeling" changes on a touch screen or the like. The type of vibrations may be controlled, e.g., slow or fast vibrations, to simulate touching physical objects and elements on the screen. Thus, haptic feedback may provide a way of addressing the inability of a user to, for example, feel the visual keys of a keypad on a touch screen display.

Several haptic technologies are available now, including but not limited to vibration motor actuation, piezoelectric actuation, and electro-active polymer actuation.

When implementing haptic feedback, the force of the touch is not accounted for.

SUMMARY

Thus, at least one object of the present invention remedies the above mentioned problem with respect to current systems and provide one or more advantages described below.

According to example embodiments, a method of providing a user interaction is described, comprising: receiving a user input through a touch screen interface of a touch sensitive screen; calculating a force value corresponding to said user input; and providing a feedback by means of feedback element with respect on the calculated force value. According to one embodiment the force value affects said feedback by increasing and/or decreasing said feedback. In one embodiment the calculating the force value further comprises: comparing an applied force by the user to a threshold force value; determining a difference percentage of the applied force and the threshold force value; and controlling a feedback element based on a difference percentage. In one embodiment the calculating the force value further comprises: detecting a distance between the touch screen to a pointing object, recalculating the distance to a force value; and controlling the feedback element based on a distance.

The invention also relates to an electric device comprising a screen, cooperating with said screen, a sensor for detecting a presence of an object on or close to said screen, a controller and a feedback element. The controller is configured to interpret said presence of the object and calculate a force value and control said feedback element to provide a feedback with respect to the force value. The device may further comprise a signal input to said controller from said feedback element. The device may further comprise a low pass filter connected between said controller and a touch screen input. In one embodiment the device may further comprise a band-pass or high-pass filter connected between said controller and said feedback element. According to one embodiment the device of comprises a force sensitive touchscreen. According to another embodiment, the device comprises a touch sensitive screen comprising means for generating an electrical signal indicating a positional property of the pointing object and an extent property of a mechanical interaction within a sensing zone. The device may also comprise a sensor for capacitive and electric field sensing based on transmitting a signal by means of one or several electrodes and receiving a response with another electrode(s). In one embodiment, the controller is configured to define the force value on a surface of the screen as a distributed force on an area and thereby determining relation of the screen surface against a surface and adapting the feedback.

The invention also relates to a multimedia device for displaying images, comprising a device as described above.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION

In the following description, for purposes of explanation and not limitation, specific details are set forth, such as particular components, elements, techniques, etc. in order to provide a thorough understanding of the example embodiments presented herein. However, it will be apparent to one skilled in the art that the example embodiments may be practiced in other manners that depart from these specific details. In other instances, detailed descriptions of well-known methods and elements are omitted so as not to obscure the description of the example embodiments.

Example embodiments presented herein are directed towards interaction with a device having a touch screen utilizing a user input and application specific data. For example, embodiments presented herein may be utilized in gaming applications where a user may enter commands and receive a feedback from the device. Based on a measurement of a force component of the user input, a determination may be made as to with which magnitude a user may receive a feedback.

It should be appreciated that example embodiments presented herein may be employed in a variety of applications, for example, applications involving image, movie, gaming, menu systems, or any other type of applications known in the art which involve a form of display.

Figure 7:
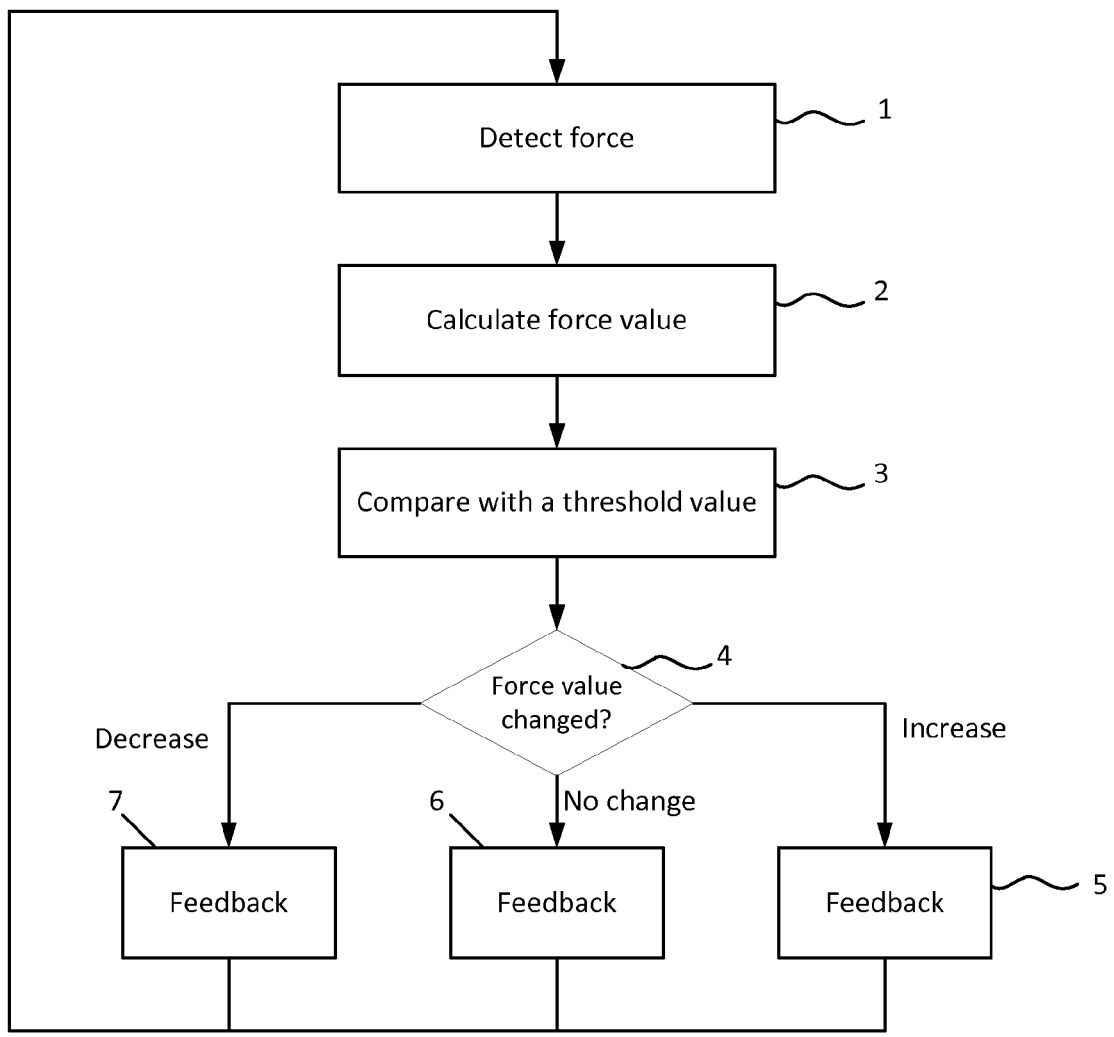
FIG. 7 illustrates schematically steps according to one exemplary method of the invention.

To summarize, as illustrated in the flow diagram of FIG. 7, a force or a distance corresponding to a force on a display by means of a pointing object of the device is detected (1). A value corresponding to force is calculated (2). In one embodiment the calculated value may be compared (3) to a threshold value. A feedback is provided to the user by means of a feedback element. If the force value changes (4), e.g. increases, the feedback may be increased (5), or no change in the force (stationary) the feedback is not changed (6), or if the force value decreases, the feedback may be decreased (7).

Figure 1:
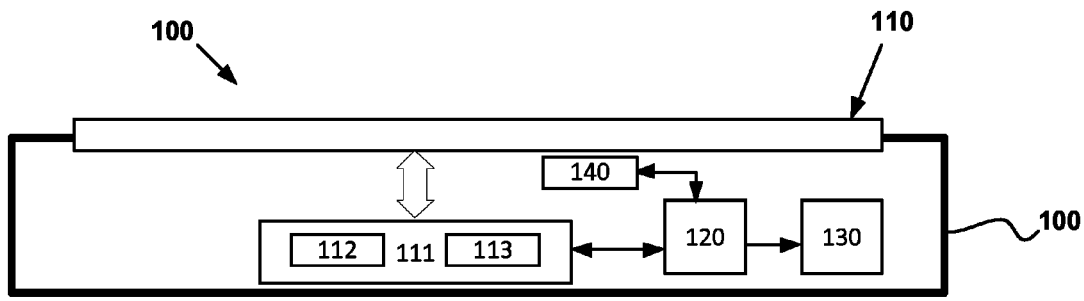
FIG. 1 is an illustrative example employing a first example embodiment.

FIG. 1 provides a cut through an illustrative and very simplified example of a first embodiment presented. An electric device, such as a mobile terminal 100, comprises a touch/force sensitive display 110. The display 110 is connected to an I/O controller 111 and a controller 120. The I/O controller 111 may include a display driver 112 and user input unit 113. The controller may further be connected to an arrangement 130 for generating a feedback. A memory unit 140 may be connected to the controller storing instructions for the controller 120 and data for sensed force and corresponding haptic feedback control.

The feedback arrangement 130 may be an actuator generating vibration and/or transient, such as a rotating, or linear motor, piezoelectric actuator and electro-active polymer actuator, a sound generator etc.

According to the first aspect of the invention, the idea is to sense the force, e.g. applied on the surface of the display and the position of the pointing device and use the information to control the (haptic) feedback system. The term "force" as employed herein, may refer to a direct physical force applied by a pointing device on the surface or a realization of force corresponding to a distance between the surface of the screen and the pointing device. In the latter, a shorter distance may be assumed as a certain amount of force, and increasing distance an increase of amount of the force and decreasing distance a decreasing amount of force.

The term "haptic feedback" as used herein, generally refers use of the sense of touch in a user interface design to provide information to the user, e.g. in form of vibrations from the device's vibration alarm to denote that a touchscreen button has been pressed. However, it may also refer to audible or visual output.

According to a second aspect of the invention the signal from the actuator is used in a closed loop control system to optimize the driving of the actuator to substantially optimize the performance of the haptic feedback.

Figure 2:
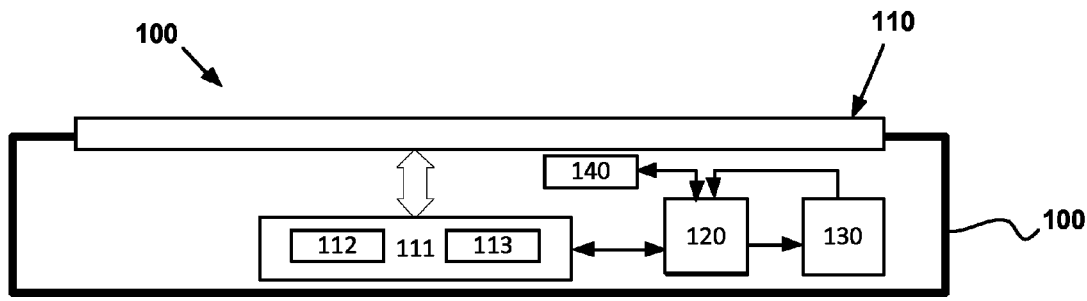
FIG. 2 is an illustrative example employing a second example embodiment.

FIG. 2 is a schematic of a second embodiment of the invention. The electric device, such as mobile terminal 100, in same way as embedment of FIG. 1, comprises a touch sensitive display 110. The display 110 is connected to an I/O controller 111 and a controller 120. The I/O controller 111 includes a display driver 112 and user input unit 113. The controller is further connected to a feedback generating unit 130. An output signal of the feedback generating unit 130 is connected to the controller 120 for providing a signal feedback. Increased load, changes the resonant frequency of the system, the driver system changes the amplitude and/or frequency of the feedback element.

The haptic feedback may also be used as an alert signal (audio and/or mechanical (vibration)).

In one embodiment, the force on the surface of the touch sensitive screen may be defined as a distributed force on a larger area than a small spot, which is the case when pointing with a finger or stylus. This may be used to determine whether the device is against a surface, e.g. in a pocket or case, or not and adapt the haptic feedback, e.g. for alerting. This may be used in case of, for example a cell phone in the pocket or bag of a user.

In one embodiment, the magnitude of the force on the surface of the touch sensitive screen may affect the feedback. A harder pressure on the screen by the user (finger), i.e. increased load, changes the resonant frequency of the system and the driver system changes the amplitude and/or frequency of the feedback element. The change of the feedback may be proportional to the force applied on the screen. One example is when scrolling a content on the screen, the harder the user presses his finger, the faster the content may be scrolled. Proportional to this the haptic feedback may be varied with respect to the pressure of the finger.

Normally, the force sensed from the user and the vibration or transient from the (feedback) actuator may have different frequency spectrum. The signal indicating the force may vary from static DC to some hertz, e.g. approx. 10 Hz and the actuator signal may range between some hertz and some hundred hertz. These signals must be separated.

Figure 3:
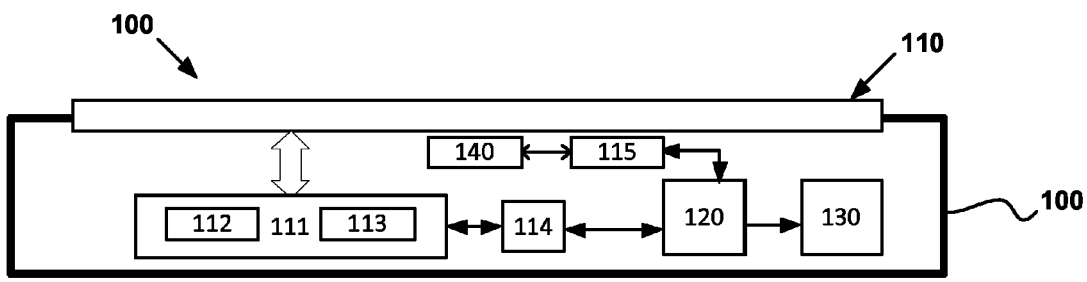
FIG. 3 is an illustrative example employing a third example embodiment.

In one embodiment, as illustrated in FIG. 3, a low-pass filter 114 or similar is used to filter the signal from the force sensor to extract the force applied by the user. The effect of the feedback element 140 can be distinguished and monitored using, e.g. a filter, such as a band-pass or high-pass filter 115, selective at the vibration or transient frequency generated by the element 140.

The touch sensitive screen as mentioned earlier may be configured as any suitable human-computer interface or touch/contact surface assembly. The touch screen device may be any touch screen, touch pad, touch sensitive structure, computer monitor, laptop display device, workbook display device, kiosk screen, portable electronic device screen, or other suitable touch sensitive device. The touch screen device may be configured for physical interaction with a user-controlled device, such as a stylus, finger, etc. In some embodiments, the touch screen device may include at least one output device and at least one input device.

The touch sensitive screen device may provide haptic feedback to at least a portion of the electronic device, which can be conveyed to a user in contact with the electronic device. Particularly, the touch screen device can provide haptic feedback to the touch screen itself to impose a haptic effect when the user in is contact with the screen. The haptic effects can be used to enhance the user experience, and particularly can provide a confirmation to the user that the user has applied a certain amount of force to or interacted with the screen to be detected by the touch screen device.

The electronic device may be any device, such as a mobile terminal, such as a mobile radio telephone, a desk top computer, laptop computer, electronic workbook, electronic handheld device (such as a gaming device, personal digital assistant ("PDA"), portable e-mail device, portable Internet access device, calculator, etc.), kiosk (such as an automated teller machine, ticking purchasing machine, etc., printer, point-of-sale device, game controller, or other electronic device.

The controller may be a general-purpose or specific-purpose processor or microcontroller for managing or controlling the operations and functions of the electronic device. For example, the controller may be specifically designed as an application-specific integrated circuit ("ASIC") to control output signals to a driver of the input/output devices to provide haptic effects. The controller may be configured to decide, based on predefined factors, what haptic effects are to be provided, the order in which the haptic effects are provided, and the magnitude, frequency, duration, and/or other parameters of the haptic effects. The controller can also be configured to provide streaming motor commands that can be used to drive the haptic actuators for providing a particular haptic effect. In some embodiments, the controller may actually include a plurality of processors, each configured to perform certain functions within the electronic device.

The memory may include one or more internally fixed storage units, removable storage units, and/or remotely accessible storage units. The various storage units may include any combination of volatile memory and non-volatile memory. The storage units may be configured to store any combination of information, data, instructions, software code, etc. More particularly, the storage devices may include haptic effect profiles, instructions for how the haptic actuation devices of the input/output devices are to be driven, or other information for generating haptic effects.

In addition to the touch sensitive screen, the input/output devices may also include specific input mechanisms and output mechanisms. For example, the input mechanisms may include such devices as keyboards, keypads, cursor control devices (e.g., computer mice), or other data entry devices. Output mechanisms may include a computer monitor, virtual reality display device, audio output device, printer, or other peripheral devices. The input/output devices may include mechanisms that are designed to not only receive input from a user and but also provide feedback to the user, such as many examples of touch screen devices. The touch sensitive screen and other input/out devices may include any suitable combination and configuration of buttons, keypads, cursor control devices, touch screen components, stylus-receptive components, or other data entry components. The touch sensitive screen may also include any suitable combination of computer monitors, display screens, touch screen displays, haptic or tactile actuators, haptic effect devices, or other notification devices for providing output to the user.

Figure 4:
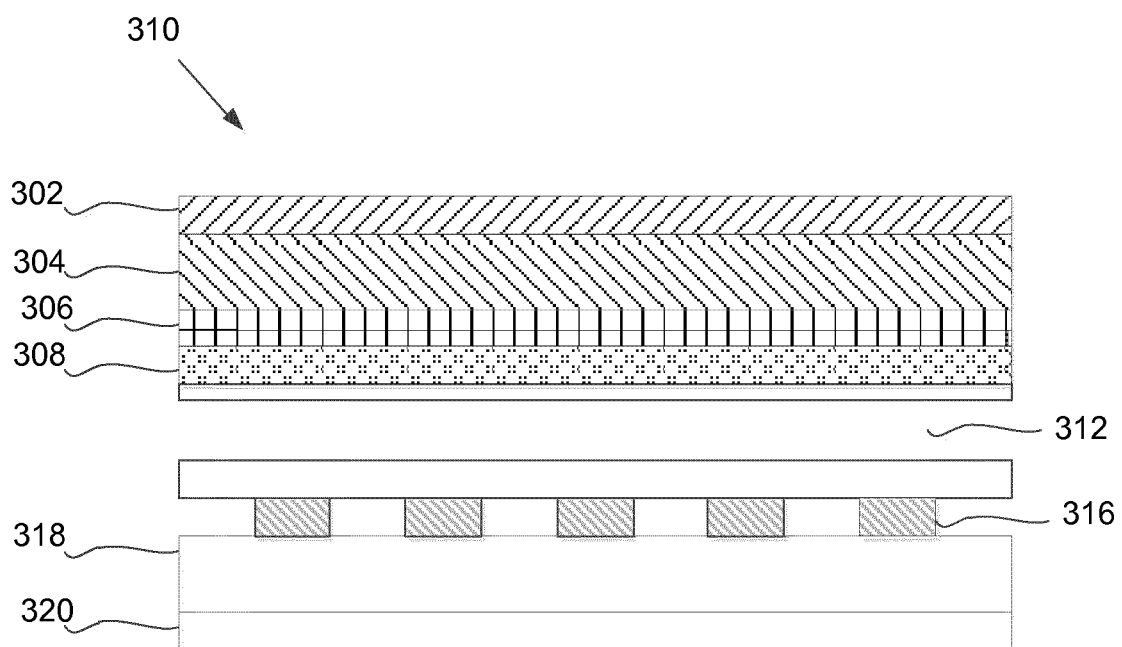
FIG. 4 illustrates schematically a cross sectional view through a touchscreen for measuring force according to one embodiment.

FIG. 4 is a cut through a part of one exemplary force sensitive touchscreen 310. The screen 310 may consist of a sandwich of liquid crystal 312 between a top glass substrate 304 and a bottom glass substrate 318 with polarizers 302, 320 on the external surfaces of the glass substrates 304, 318. On the internal surface of the top glass substrate 304 is a colour filter 306. A first layer of strips of transparent electrodes 308 is on the top glass substrate 304. A second layer of transparent electrodes 316 is attached on the internal surface of the bottom glass substrate 318, perpendicular to the first layer of electrodes 308. Therefore if the first layer of electrodes ran in a direction parallel to the width (commons) of the glass substrates 304, 318, then the second layer of electrodes 316 runs in a direction parallel to the length (segments) of the glass substrates 304, 318. Wherever a strip from the first layer of electrodes 308 crosses a second strip from the second layer of electrodes 316, a pixel element is formed.

The electrical model of a pixel is similar to a capacitor. The intersection of segments and commons of strip 308, 316 form capacitor plates and the liquid crystal 312 acts as the dielectric of a capacitor (C). Voltage V across this capacitor is equal to charge Q over capacitance C (V=Q/C), therefore, voltage is proportional to the distance between the plates. When a force is applied to the surface of the top glass, i.e. substrate 304, such as a press with a finger or stylus, the distance between the top and bottom glass substrates 304, 318 changes and thus the distance between the strip electrodes 308, 316 changes.

When the distance between the electrodes changes, the capacitance of the pixel changes and the change in capacitance can be detected by the resulting change in voltage at that pixel. Because of the relationship between voltage and distance between the plates, as the electrodes get closer, the pixel voltage will decrease. Using the capacitance change of a pixel the location and amount of an applied force may be measured.

The invention may also be used in devices, which sense the distance between the screen surface and the pointing object.

Figure 5:
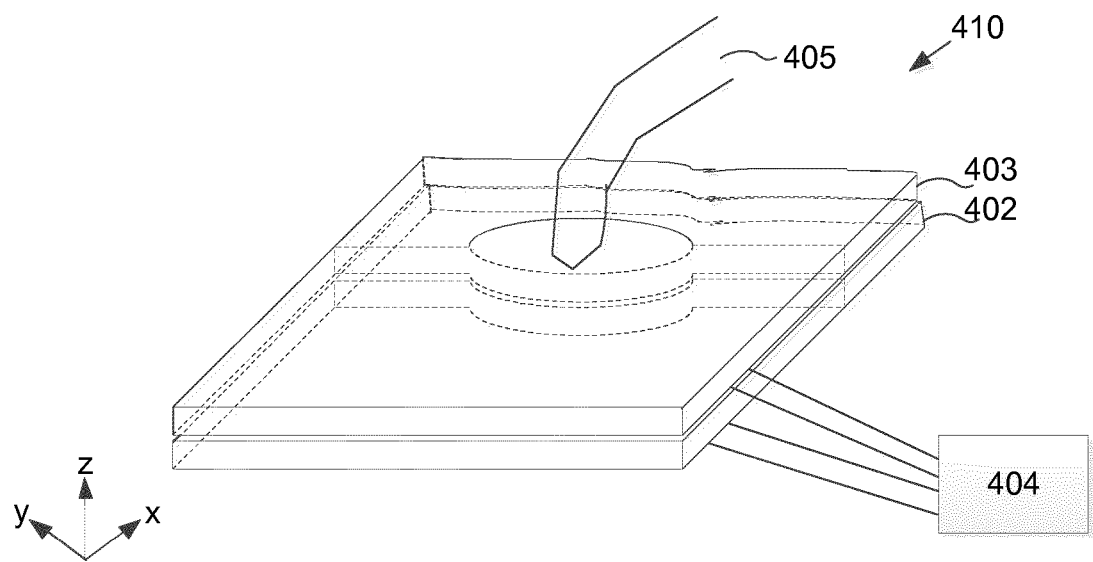
FIG. 5 illustrates schematically a perspectival view of a touchscreen for measuring force according to a second embodiment.

Another embodiment of a portion of a touchscreen 410 is shown in FIG. 5, which illustrates a touchscreen 410 for generating electrical signals indicating a positional property and an extent property of a mechanical interaction within a sensing zone. Touchscreen 410 comprises a plurality of conductive layers that comprises at least a first conductive layer 402 and a second conductive layer 403. At least one of the plurality of conductive layers is a force sensitive conductive layer, which may comprise a quantum tunneling conductance (qtc) material. The touchscreen 410 is configured such that contact between conductive layers is allowed during the absence of a mechanical interaction within the sensing zone.

The plurality of conductive layers of the touchscreen is provided with an arrangement of electrical terminals (not shown). The electrical terminals may be arranged to provide the touchscreen with a three-terminal sensing arrangement, to allow a single positional value and an extent value of a mechanical interaction to be determined. In Cartesian co-ordinates, a three-terminal sensing arrangement allows a measurement in the X-axis or Y-axis direction, along with a measurement in the Z-axis direction. The electrical terminals may be arranged to provide the touchscreen with a four-terminal sensing arrangement, to allow first and second positional values and an extent value of a mechanical interaction to be determined. In Cartesian co-ordinates, a four-terminal sensing arrangement allows a force measurement in the X-axis direction and the Y-axis direction, along with a force measurement in the Z-axis direction.

The touchscreen 410 may be connected to the interface module 404 in electrical connection with the electrical terminals of the plurality of conductive layers. Touchscreen 410 is configured to respond to a mechanical actuator. In one embodiment, the touchscreen is configured to be responsive to actuation by a finger 405.

In some embodiments, a touch surface can be provided in areas of the electronic device outside of the touchscreen. In yet further embodiments, the touch surface may be an external touchpad that can be connected to the cell phone (or other computational device) by means of a cable to a cable connector or a wireless transceiver.

Figure 6:
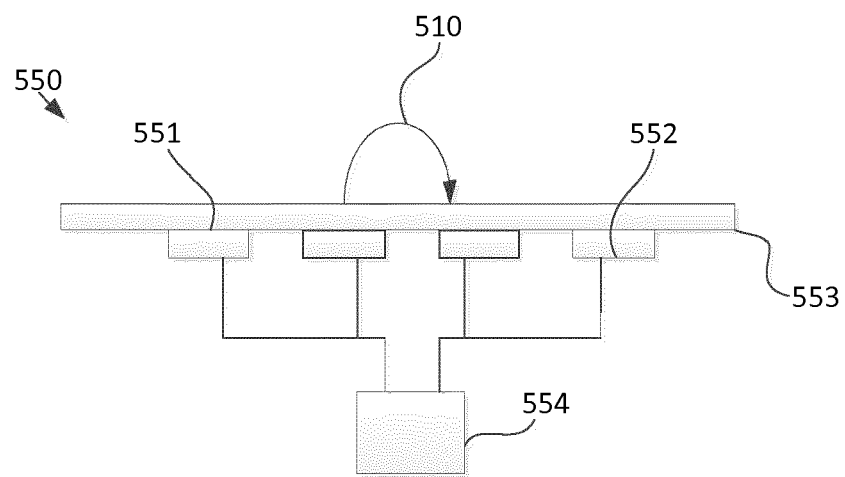
FIG. 6 illustrates schematically a cross sectional view through a touchscreen for detecting presence of a nearby object, according to one embodiment.

A three-dimensional sensing in a volume above the display 110 of a device 100 to detect gesture together with suitable user interface (UI) is illustrated in schematic of FIG. 6. The UI may be 3D (three-dimensional) as well and also be used together with a 3D display or a projector.

According to this embodiment an object, e.g. a user's finger is sensed in a 3D volume by using capacitive or electric field sensing. FIG. 6 illustrates a device 550 for capacitive and electric field sensing based on transmitting a signal 560 by means of one or several electrodes 551 and then receiving the response with another electrode(s) 552. The electrodes may be arranged behind a display layer 553 and controlled by a controller 554. If an object is close enough to the touch surface, a change in the capacitive coupling between the electrodes and the ground will be detected as the received signal strength will change.

In 3D detection embodiments, the distance change between the electrode and the pointing object is interpreted as pressure change. The pressure change affects the haptic feedback as described earlier.

As used herein, a "touch-screen" refers to a screen or portion of a screen which may be part of a touch input device with an associated image display having a "touch surface". A touch surface may be integral parts of an electronic device, such as a touch screen display, or a separate module which can be coupled to the electronic device by a wired or wireless data link.

The various embodiments of the present invention described herein is described in the general context of method steps or processes, which may be implemented in one embodiment by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Software and web implementations of various embodiments of the present invention can be accomplished with standard programming techniques with rule-based logic and other logic to accomplish various database searching steps or processes, correlation steps or processes, comparison steps or processes and decision steps or processes. It should be noted that the words "component" and "module," as used herein and in the following claims, is intended to encompass implementations using one or more lines of software code, and/or hardware implementations, and/or equipment for receiving manual inputs.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be implemented at least in part by means of both hardware and software, and that several "means", "units" or "devices" may be represented by the same item of hardware.

The foregoing description of embodiments of the present invention, have been presented for purposes of illustration and description. The foregoing description is not intended to be exhaustive or to limit embodiments of the present invention to the precise form disclosed, and modifications and variations are possible in light of the above teachings or may be acquired from practice of various embodiments of the present invention. The embodiments discussed herein were chosen and described in order to explain the principles and the nature of various embodiments of the present invention and its practical application to enable one skilled in the art to utilize the present invention in various embodiments and with various modifications as are suited to the particular use contemplated. The features of the embodiments described herein may be combined in all possible combinations of methods, apparatus, modules, systems, and computer program products.

The invention claimed is:

1. An electric device comprising:
a force and touch sensitive screen configured to detect and output a detection signal representing a force generated by an object interacting with the force and touch sensitive screen;
a haptic feedback element configured to generate a haptic feedback;
a controller configured to control the haptic feedback element based on the force generated by the object interacting with the force and touch sensitive screen;
a first filter element arranged between the force and touch sensitive screen and the controller, wherein the first filter element is configured to filter out the force generated by the object interacting with the force and touch sensitive screen from a force generated by the haptic feedback.

2. The device of claim 1, further comprising a signal input to the controller from the feedback element.

3. The device of claim 1, wherein the first filter element is a low pass filter.

4. The device according to claim 1, wherein the force and touch sensitive screen comprises means for generating an electrical signal indicating a positional property of the object and an extent property of a mechanical interaction within a sensing zone.

5. The device according to claim 1, further comprising a sensor for capacitive and electric field sensing based on transmitting a signal by means of one or several electrodes and receiving a response with another electrode(s).

6. The device according to claim 1, wherein said controller is configured to define the force on a surface of the screen as a distributed force on an area and thereby determining relation of the screen surface against a surface and adapting the haptic feedback.

7. The device according to claim 1, wherein the feedback further comprises audible and/or visual feedback.

8. The device according to claim 1, wherein the electric device is a multimedia device for displaying images.

9. The electric device of claim 1, further comprising a second filter element configured to receive a control signal output from the controller, filter the control signal, and output the filtered control signal,
wherein the feedback element is configured to receive the filtered control signal output from the second filter element and generate the haptic feedback based on the filtered control signal.

10. The device of claim 9, wherein said second filter element is one of a band-pass or high-pass filter.

11. The electric device of claim 1, wherein the controller is configured to control the amplitude of the haptic feedback based on the force generated by the object interacting with the force and touch sensitive screen.

12. The electric device of claim 11, wherein the amplitude of the haptic feedback is proportional to the force generated by the object interacting with the force and touch sensitive screen.

13. The electric device of claim 1, wherein the controller is configured to control the frequency of the haptic feedback based on the force generated by the object interacting with the force and touch sensitive screen.

14. The electric device of claim 13, wherein the frequency of the haptic feedback is proportional to the force generated by the object interacting with the force and touch sensitive screen.

15. An electric device comprising:
a force and touch sensitive screen configured to detect and output a detection signal representing a force generated by an object interacting with the force and touch sensitive screen;
a haptic feedback element configured to generate a haptic feedback;
a controller configured to control the haptic feedback element based on the force generated by the object interacting with the force and touch sensitive screen, wherein the amplitude of the haptic feedback is dependent on the force generated by the object interacting with the force and touch sensitive scree, wherein the amplitude of the haptic feedback is proportional to the force generated by the object interacting with the force and touch sensitive screen;
wherein the detection signal is directly proportional to a magnitude of the force generated by the object interacting with the force and touch sensitive screen.

16. The electric device of claim 15, wherein the amplitude of the haptic feedback is proportional to the force generated by the object interacting with the force and touch sensitive screen.

17. An electric device comprising:
a force and touch sensitive screen configured to detect and output a detection signal representing a force generated by an object interacting with the force and touch sensitive screen;
a haptic feedback element configured to generate a haptic feedback;
a controller configured to control the haptic feedback element based on the force generated by the object interacting with the force and touch sensitive screen, wherein the frequency of the haptic feedback is dependent on the force generated by the object interacting with the force and touch sensitive screen;
wherein the detection signal is directly proportional to a magnitude of the force generated by the object interacting with the force and touch sensitive screen.

18. The electric device of claim 17, wherein the frequency of the haptic feedback is proportional to the force generated by the object interacting with the force and touch sensitive screen.

* * * * *